United States Patent

[11] 3,634,669

[72] Inventors Charles A. Soumas
Wyckoff;
David J. Spontak, Belleville, both of N.J.
[21] Appl. No. 842,259
[22] Filed July 16, 1969
[45] Patented Jan. 11, 1971
[73] Assignee Aero-Flow Dynamics, Inc.
New York, N.Y.

[54] ANALOG COMPUTATION OF INSURANCE AND INVESTMENT QUANTITIES
10 Claims, 9 Drawing Figs.

[52] U.S. Cl.................................................... 235/184,
235/194, 235/196
[51] Int. Cl........................................................ G06g 7/52,
G06g 7/16
[50] Field of Search..........................................235/184–185,
193–196, 198

[56] References Cited
UNITED STATES PATENTS

| | | | |
|---|---|---|---|
| 3,270,190 | 8/1966 | Lambert........................ | 235/194 |
| 3,491,194 | 1/1970 | Smith............................ | 235/184 X |
| 3,500,030 | 3/1970 | Clarke........................... | 235/195 X |

Primary Examiner—Malcolm A. Morrison
Assistant Examiner—Jerry Smith
Attorney—George E. Kersey

ABSTRACT: A portable analog computer for determining insurance requirements, taking net worth into account, and for calculating investment returns on funds that are incremented periodically and earn compound interest at a prescribed rate.

The computer includes assemblages that are oppositely energized from a common power supply and are connectable to a single indicating instrument. The latter is switchable to indicate direct computations and the difference between certain computations. Consequently, the computer can indicate the total funds required for specified family needs, the total net worth of the family and the difference between the two, which can be provided by insurance.

Among the funds required for specified family needs are those used in making guaranteed monthly payments over a prescribed number of years and those used in meeting lump sum obligations. Each constituent of these funds is calculated using a potentiometer arrangement in which a constant voltage from the power supply is converted into an output current that is proportional to the amount in question. The output currents are variously combined and read by an ammeter indicating instrument. In the case of the monthly income fund, a resistive element is included between the source of constant voltage and the associated potentiometer arrangement in order to discount the indicated result in accordance with the interest rate paid on funds that are held to make monthly payments.

Also included in the computer is a potentiometer arrangement for making the desired compound interest calculations, in which the amount being compounded is incremented periodically. This arrangement is loaded by a resistive network that is set in accordance with the particular interest rate.

ANALOG COMPUTATION OF INSURANCE AND INVESTMENT QUANTITIES

BACKGROUND OF THE INVENTION

This invention relates to the evaluation of a situation in terms of prescribed input quantities and, more particularly, to the evaluation of insurance and investment situations.

To rapidly evaluate a situation, it is customary to employ either a digital or an analog computer. In a digital computer, each input quantity is converted into a set of discrete signals, which may be electrical or mechanical. An analog computer, on the other hand, converts each input quantity into a proportional electrical or mechanical magnitude. Such computers are desirable where the inputs are numerous or the evaluation is complex.

Thus, in the case of a life insurance evaluation there are such items to consider as the lump sum obligations that will require payment after the death of the insured, the various monthly amounts the insured would like to have paid to the family over a variety of different periods, and the particular assets from which the foregoing payments can be partially met.

Such an evaluation is readily made using a digital computer. There is the objection, however, that getting the information into the machine can be a relatively complicated procedure, even when there is remote access. Usually, it is necessary to prepare punched cards which are read into the machine. Moreover, aside from cost considerations, there is the added objection that the evaluation is not quickly available, unless it is being prepared at a computer installation or at one of its remote terminals.

Accordingly, it is an object of the invention to expedite the evaluation of life insurance situations. A related object is to facilitate the input of information from which the evaluation is to be made. Another object is to make evaluations quickly available, independently of any particular location.

It is desirable for the effects of the various factors to be observable during the course of the evaluation. This is difficult in the case of digital processing. It is also desirable to be able to correct or alter the inputs while the evaluation is taking place.

In addition, interest payments should be taken into account in the evaluation of an insurance fund to be used in paying a specified monthly sum over a prescribed number of years. As a corollary to the evaluation of insurance quantities, it is desirable to be able to indicate the ultimate value of a monthly investment that is compounded over a specified number of years at a particular rate of interest.

Accordingly, it is a further object of the invention to achieve a computational device in which an evaluation of inputs can be made and indicated on a step-by-step basis, while permitting the inputs to be changed during the course of the evaluation. Another object is to adapt the computational device for taking interest into account, as well as for determining the cumulative value of monthly sums invested at compound interest over a specified period.

Still another object is to provide a simplified device for making the foregoing computations. A related object is to achieve a wide variety of computations using a single indicating instrumentality.

SUMMARY OF THE INVENTION

In accomplishing the foregoing and related objects, the invention provides an analog computer in which evaluations are made of individual results, and the difference between results, using a single indicating instrumentality. Such a computer is able to evaluate the total funds required to meet specified needs, the funds available to meet those needs, and the difference between the two, representing actual needs that can be supplied by insurance.

In accordance with one aspect of the invention at least two separate networks are differentially energizable by a common power supply. The first network is for total funds, and the second is for available funds. Each network includes a group of electrical elements which are selectively settable in accordance with various inputs. For the first network the inputs include the amounts of desired monthly income over specified numbers of years, and fixed obligations such as the amount of the mortgage on the family home. In the case of the second network, the inputs are assets such as present life insurance.

In accordance with another aspect of the invention, the power supply provides a source of constant voltage for each network, and the settable elements are potentiometers. The outputs of the potentiometers are converted to currents, and are then combined and read by the indicating instrumentality, which takes the form of an ammeter. When the networks are differentially energized they are readily switched with respect to the ammeter to produce the desired direct and differential indications.

In accordance with a further aspect of the invention each fund for providing a specified monthly income is discounted in accordance with a specified interest rate by using a resistor to interconnect the associated potentiometer with its voltage source.

In accordance with still another aspect of the invention, the analog computer is supplemented by a compound interest calculator unit in which a potentiometer that is set with the number of years of investment is resistively loaded according to the interest rate.

BRIEF DESCRIPTION OF THE DRAWINGS

Other aspects of the invention will become apparent after considering an illustrative embodiment, taken in conjunction with the drawings in which.

DESCRIPTION OF AN ILLUSTRATIVE EMBODIMENT

Figure 1:
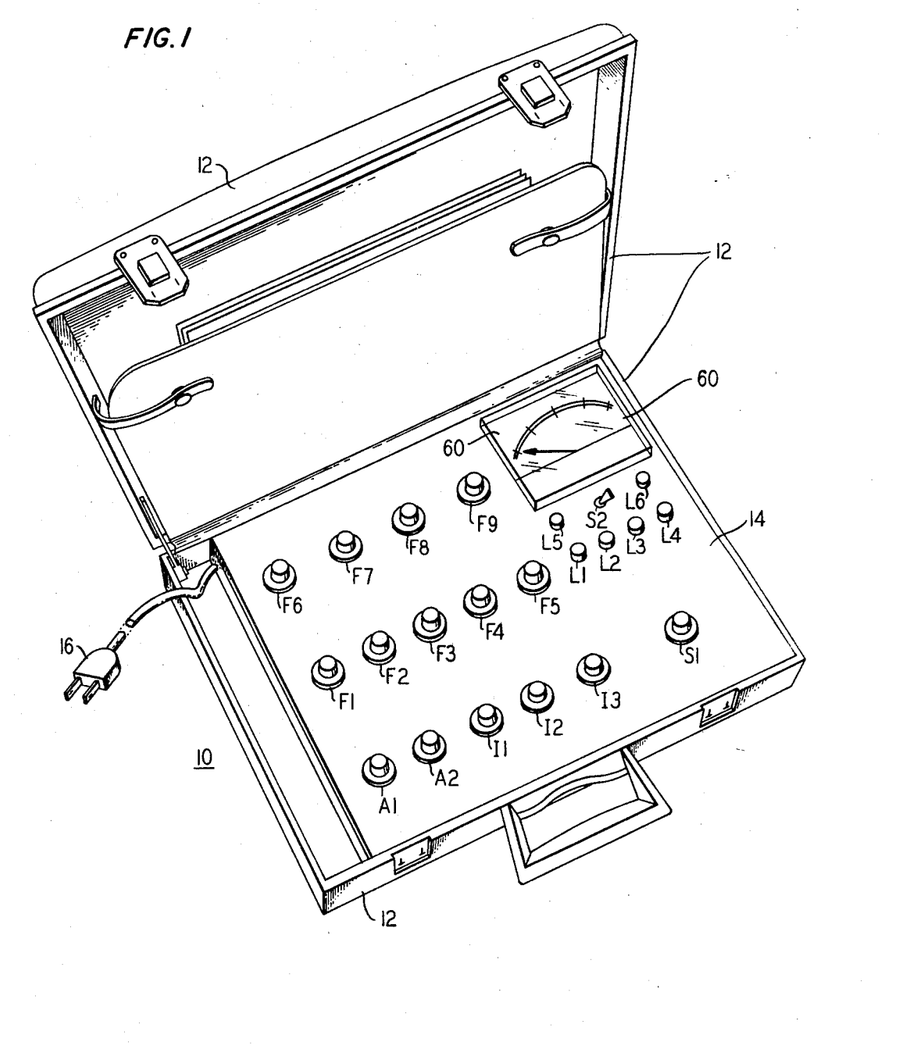
FIG. 1 is a perspective view of a portable life insurance computer in accordance with the invention.

Turning to the drawings, a portable analog computer 10 in accordance with the invention is shown in FIG. 1 housed in a carrying case 12 of conventional design. The latter is open, exposing a control panel 14 for the computer circuitry located in the lower portion of the case 12. Included on the control panel 14 are the face of an indicating unit 60, a multiplicity of control knobs bearing prefix designation A, I, and F, and switches S1 and S2. The various switch positions are indicated by associated lamps L1 through L6.

In operation of the computer 10, the knobs are set in accordance with the magnitudes of input quantities of the situation to be evaluated, and the switches are positioned to produce desired output readings on the unit 60.

The illustrative computer 10 of FIG. 1 is powered from a standard source of line voltage through a cord 16. It will be appreciated that the computer may be adapted to operate from other types of sources, both external and internal, including batteries.

The Control Panel

Figure 2:
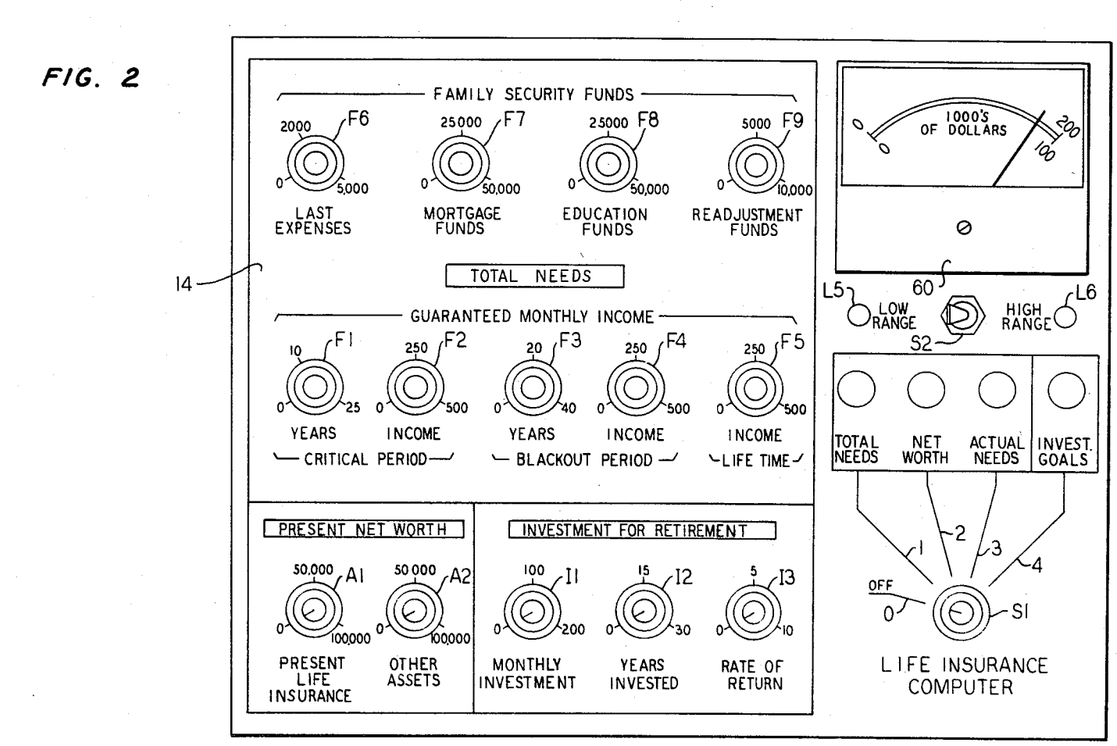
FIG. 2 is a diagram of the control panel for the computer of FIG. 1.

Representative details of the control panel 14, as adapted for a life insurance computer, are set forth in FIG. 2.

The right-hand portion of the panel 14 includes the indicating unit 60 in the form of a meter calibrated in thousand dollar amounts. There are two meter ranges selected by the position of the switch S2. In the left-hand or low-range position, the meter scale extends from 0 to 100. For the right-hand or high-range position the meter scale extends from 0 to 200.

Below the meter switch S2 is a five-position calculator switch S1. There are four operative switch positions 1 through 4. The remaining position is for switching the computer "off." The first operative switch position relates to the "total needs" control knobs F1 through F9 in the upper left-hand portion of the panel 14.

Similarly, the second operative position of the switch S1 is associated with the "present net worth" control knobs A1 and A2 in the lower left-hand portion of the panel. The third position is used to calculate "actual needs" in terms of the difference between "total needs" and "net worth."

The selector switch S1 also has a fourth operative position for evaluating investment in terms of the settings of the knobs I1 through I3 in the "income for retirement" section of the panel 14.

To make insurance calculations, the computer is plugged into a power outlet and all of the knobs on the panel 14 are initially set to zero. The switch S1 is set for the low-range of the meter 60, and the switch S2 is set to the "total needs" position. When set in this way, the computer 10 is ready for evaluating the total money needs of a family in the event of the death of the head of the household.

The total needs are in terms of "guaranteed monthly income" amounts and "family security funds." The former include various monthly income amounts and payment periods that a widow, for example, would require after the death of her husband as a supplement to her social security allowance. The family security funds are those needed to pay certain lump sum obligations after the death of the husband.

If there are minor children in the family, the supplemental monthly income of the widow is required in three different periods: (1) a "critical period" during which there are dependent children and social security payments are made at the maximum rate, (2) a "blackout period" from the date that the youngest child reaches 18 (or 22 if a full-time unmarried student) and the social security payments are correspondingly reduced to zero until the widow reaches retirement age (usually 62), and (3) the period of her remaining "lifetime" after retirement at an age between 60 and 65, e.g., age 62. This period is fixed and is based on her life expectancy as determined from standard actuarial tables.

The amount of money needed to provide a fixed monthly income for a specified number of years represents a fund, as provided by life insurance, from which the payments are made.

To determine the amount of the fund for the critical period, the fund knob F1 is set to the number of years in the period, and the fund knob F2 is set to the desired monthly amount. As the knob F2 is set, the corresponding amount of the fund will be indicated by the meter 60. This amount is not merely the product of the number of years F1 by the annualized monthly income F2 because of the customary practice of life insurance companies in providing interest on the funds they hold for making periodic payments, and the amount is discounted accordingly.

A similar procedure to that used in determining the money fund for the critical period is also used for the blackout period, by setting knobs F3 and F4. The reading on the meter 60 increases correspondingly. Finally the setting of the knob F5 provides the last sum of the fund needed for the desired guaranteed monthly income payments over the period in question.

For example, if the widow is to be provided with a supplemental income, above social security, of $200.00 per month during a critical period of 15 years, the fund amount is about $29,000.00 and is indicated on the meter 60. If the desired monthly supplement is to be $300.00 per month during a subsequent blackout period of 20 years, the corresponding fund amount is about $54,000.00 and the total indicated by the meter becomes approximately $83,000.00. Finally, if the widow is to receive $200.00 per month from the time she retires at age 62 until the end of the period of her life expectancy, the corresponding fund amount is about $41,000.00, and the cumulative fund becomes approximately $124,000.00. At this point it is necessary to switch the meter to its high range.

In addition to the desired monthly amounts, the lump sum obligations which are, or will become payable on the death of the insured can be indicated as well. These are: (1) the "last expenses" of the decedent, established by the setting of the knob F6, (2) the "mortgage funds" needed to pay the mortgage, if any, on the family home, established by the setting of the knob F7, (3) the "education funds" required for the children, set by knob F8, and (4) the "readjustment funds" required by the family in making an adjustment after the death of the wage earner, generally estimated at half a year's salary and set by knob F9.

For example, if the last expenses are $3,000.00; the mortgage funds are $20,000.00; the education funds are $10,000.00 and the readjustment funds are $8,000.00, the cumulative reading on the meter 60, which includes the total established by setting knobs F1 through F5, becomes approximately $165,000.00.

The cumulative reading attributable to setting of knobs F1 through F9 gives the total monetary needs of the surviving members of the family and can be provided by life insurance. However, the indicated amount can be appropriately reduced by "present net worth." For that evaluation, the switch S2 is set to the "net worth" position. The value of current life insurance is shown by the setting of knob A1, while the value of other assets is added into the total net worth by setting knob A2. Assuming, for example, that the value of current life insurance is $75,000.00 and the other assets are worth $50,000.00, the reading of the meter 60 is approximately $125,000.00.

The "actual needs" or net additional funds needed by the family, which, for example, can be provided by life insurance, are determined by setting the selector switch S1 to the "actual needs" position. Thus, where the total needs are about $165,000.00 and the net worth is about $125,000.00, the actual needs amount to the difference between total needs and net worth, or approximately $40,000.00.

In addition, the computer 10 permits an "investment for retirement" calculation of the value of a specified monthly investment compounded annually at a stated rate of return over a specified number of years. For this indication the selector switch S1 is turned to the "investment goals" position and the knobs I1, I2 and I3 are set appropriately.

As an illustration, $50.00 invested monthly (set by knob I1) for 30 years (set by knob I2) at an interest rate of 6 percent (set by knob I3), will amount to approximately $50,000.00 at compound interest at the end of the period, as compared with $18,000.00 if no interest is paid.

Block Diagram of the Computer

Figures 3, 6:
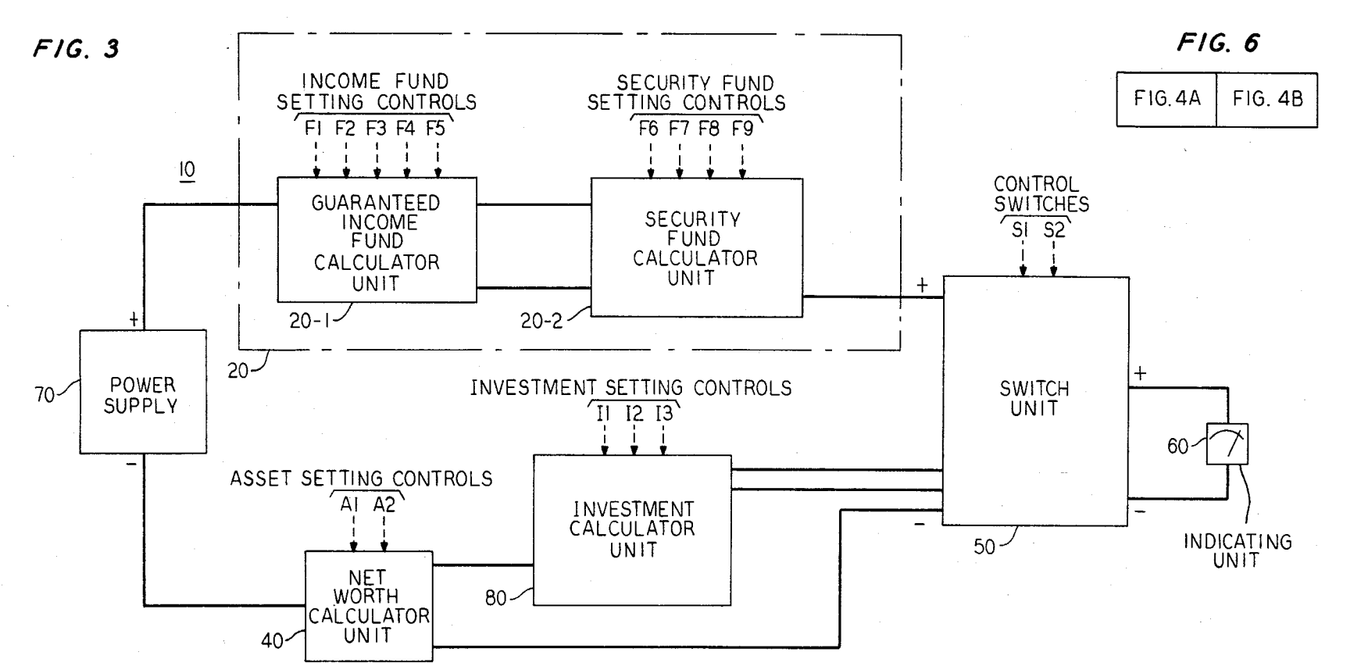
FIG. 3 is a block and schematic diagram of the computer of FIG. 1.
FIG. 6 is a key diagram showing the relationship between FIG. 4A and FIG. 4B.

Turning to the block diagram of the computer 10, its principal constituents are given in FIG. 3. There are two principal calculator assemblages 20 and 40, for respectively determining total needs and present net worth. The assemblage 20 includes a calculator unit 20-1 for the guaranteed income fund in accordance with the settings of knobs F1 through F5, and a security fund calculator unit 20-2 controlled by knobs F6 through F9.

The assemblages 20 and 40 are selectively connected to the indicating unit 60 through a switch unit 50 and are powered from a common power supply 70 with respective positive and negative voltages. Consequently, for one setting of the switch S1 the positive terminal of the indicating unit 60 can be connected to the corresponding terminal of the assemblage 20 to give an up-scale "total needs" reading. For a second setting of the switch S1 the negative terminal of the indicating unit 60 can be connected to the corresponding terminal of the assemblage 40 to give an up-scale "net worth" reading. Finally, for a third setting of the switch S1 the positive and negative terminals of the assemblages 20 and 40 can be connected to the positive terminal of the indicating unit 60 to give a difference reading, without requiring a substraction network or another indicating unit.

Additionally, the computer 10 includes an investment calculator unit 80, as controlled by knobs I1 through I3. To help balance the load on the power supply 70, the investment calculator unit is connected to the net worth assemblage 40. Investment readings appear on the indicating unit through the switch unit 50.

Circuitry of the Computer

Figure 4A:
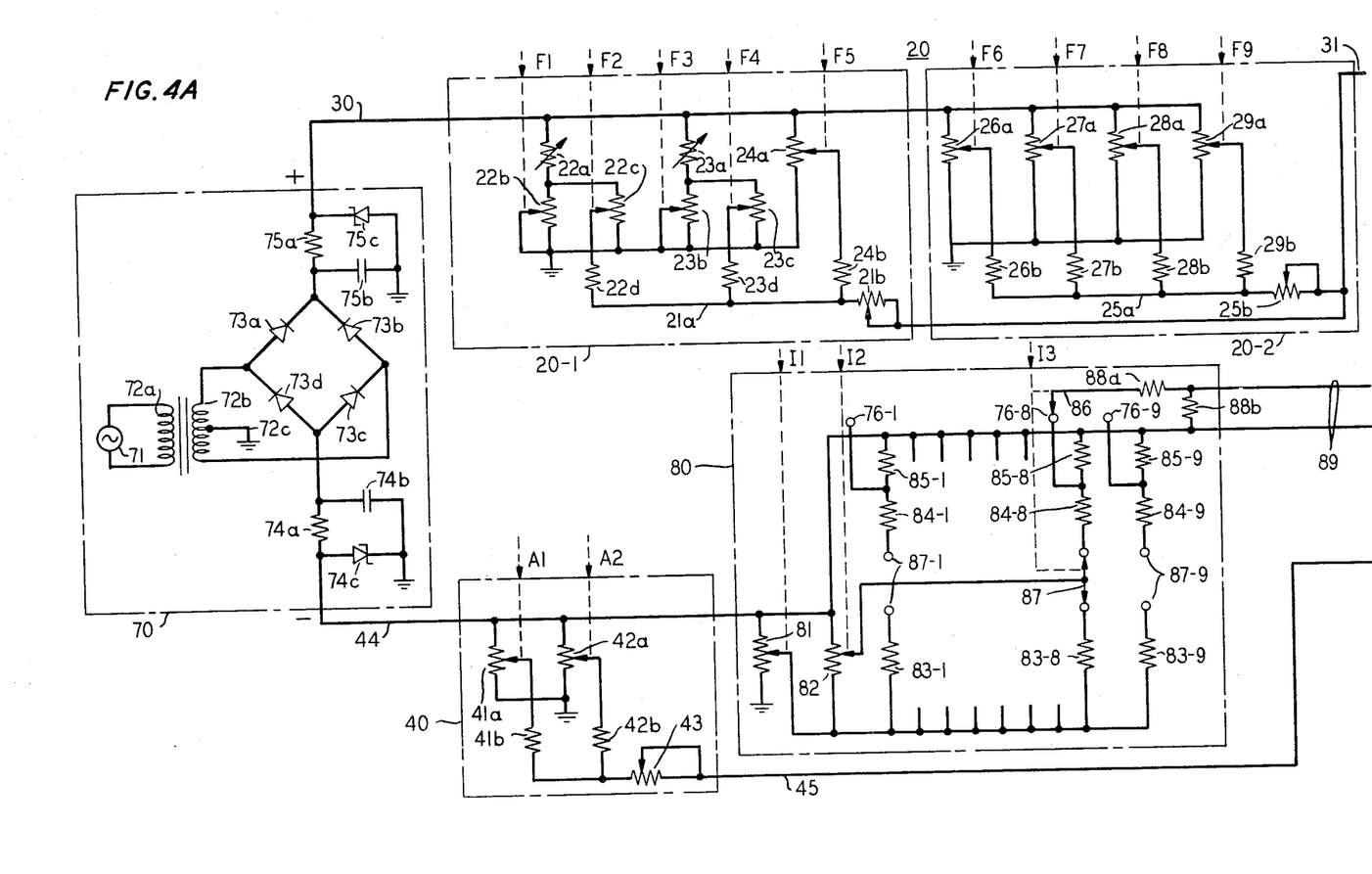
FIGS. 4A and 4B are a wiring and schematic diagram of circuit details for the block diagram of FIG. 3.
Figure 4B:
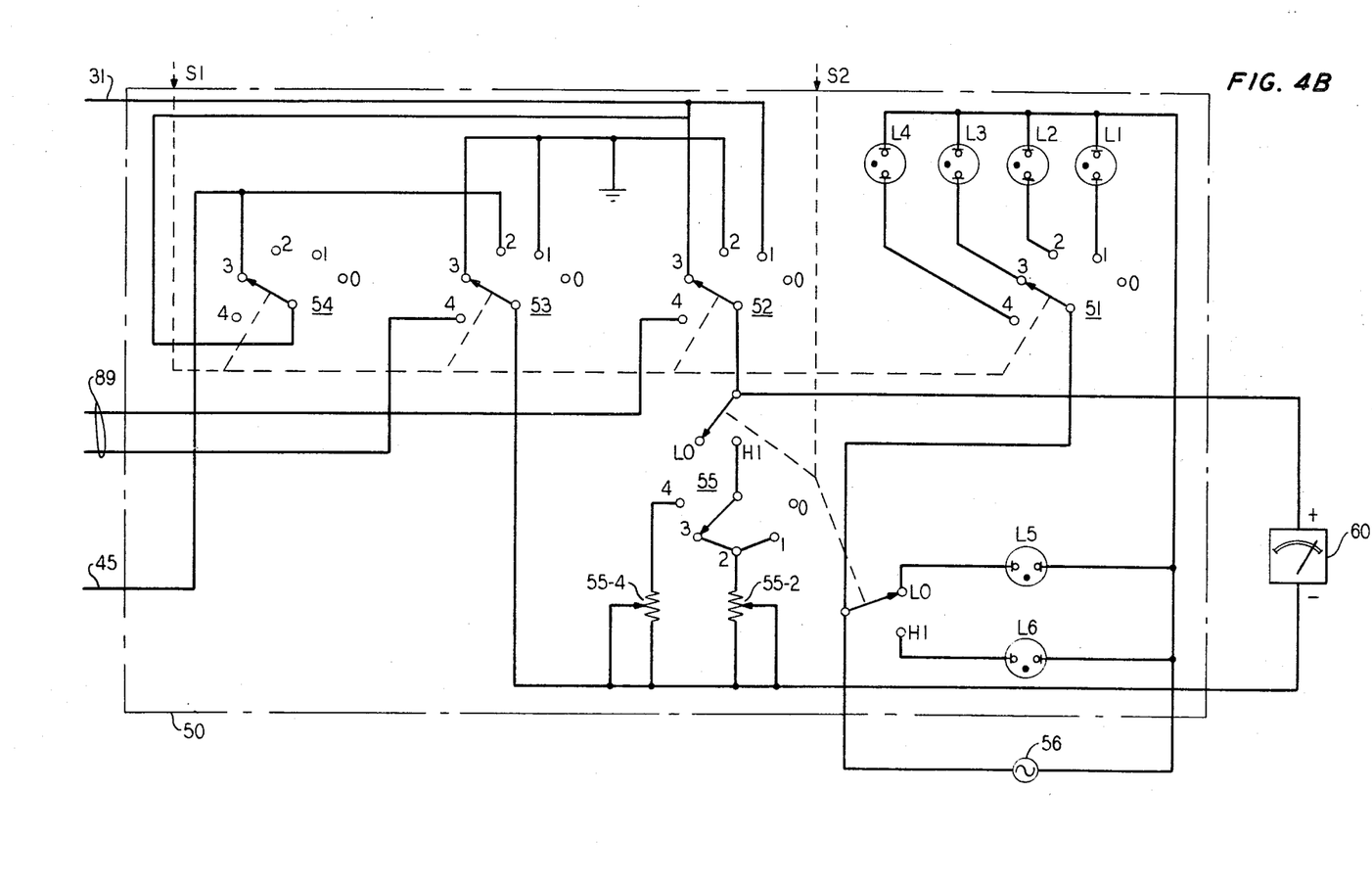

Circuit details for the block diagram of FIG. 3 are illustrated in FIGS. 4A and 4B. The designations of the overall blocks in FIGS. 4A and 4B are the same as for FIG. 3.

Beginning with the "total needs" unit 20, its constituents 20-1 and 20-2 are two ladder networks that are energized over a bus 30 from the positive polarity terminal of the power supply 70. The negative polarity terminal of the power supply 70 extends to a ladder network of the net worth unit 40 and the investment calculator unit 80. Both the positive and negative polarity terminals of the power supply 70 are voltage sources.

Income Fund Calculator Unit

In the income fund calculator unit 20-1, there are individual sets of resistive elements for the "critical period," "blackout period," and "lifetime" calculations.

The elements used in determining the fund for the "critical period" monthly payments are the potentiometers $22a$, $22b$, and $22c$, and the fixed resistor $22d$. Elements $22a$ and $22b$ desirably have relatively low-resistance magnitudes and are connected in series between the bus 30 and the ground to form one "rung" of the ladder network in the unit 20-1. Consequently, the potentiometers $22a$ and $22b$ serve as a voltage divider with respect to the potentiometer $22c$. The latter desirably has a resistance magnitude at least 10 times greater than that of the shunt potentiometer $22b$ in order to have a negligible loading effect upon it. With the setting of the element $22a$ fixed, variations in the tap position of the potentiometer $22b$ will produce voltage variations across the potentiometer $22c$ in accordance with the "years" setting of the knob F1. This voltage, as seen by the fixed resistor $22d$ is in turn modified by the setting of the "income" knob F2. The result is that the voltage applied to the resistor $22d$ is proportional to the product of years and income and is converted to a counterpart magnitude of current by the resistor $22d$. For that purpose the resistor $22d$ is desirably of substantially greater resistance magnitude than its associated elements $22a$ through $22c$.

Accordingly, the elements $22a$ through $22d$ collectively act as a variable current source with an output that is proportional to the monetary fund required to produce a guaranteed monthly amount over a prescribed number of years during the "critical period." This output initially appears on the bus $21a$ and subsequently on bus 31.

Since a current source has a relatively high-resistive magnitude, it can have a negligibly small effect on other similar sources, whose outputs are additively combined on the bus 31 and are applied to the indicating unit 60 (FIG. 4B), in the form of an ammeter, through the switch unit 50.

Figure 5A:
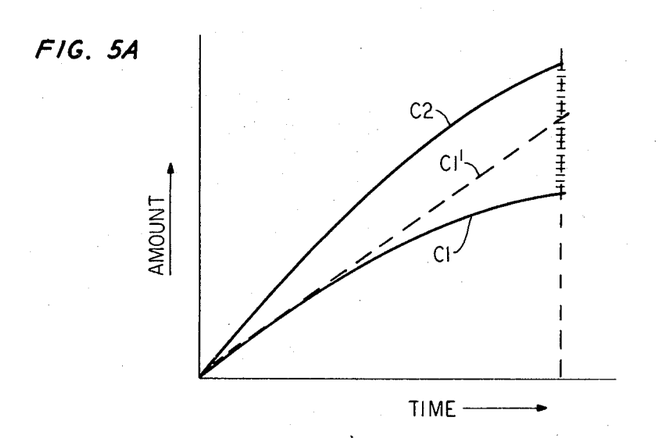
FIGS. 5A and 5B are graphs showing representative characteristics for the selected constituents of the computer of FIG. 1.

The total amount paid at a fixed monthly rate over a specified number of years is a linear function as indicated by the curve C1' of FIG. 5A. However, when the monthly amounts are provided by insurance, for example, interest is paid by the insurance company at the rate such as 3 percent and the ordinates of the linear curve C1' are discounted accordingly. The result is a curve such as C1 which is one member of a family of curves for each specified interest rate.

Another member of the family, for the same rate but for a larger monthly amount, is illustrated by the curve C2. There are as many different sets of curves as there are different settings of the potentiometer $22c$ in FIG. 4A.

It is the potentiometer $22a$ that produces the desired discount effect. For each setting of the potentiometer $22a$ the voltage $V_c$ across the potentiometer $22c$ is in accordance with equation (1).

$$V_c = V_p K_b R_b / (K_a R_a + K_b R_b) \quad (1)$$

Where $V_c$ is the voltage across the potentiometer $22c$;

$V_p$ is the constant voltage on the bus 30;

$R_a$ is the maximum resistance of the potentiometer $22a$;

$K_a$ is the effective percentage of the resistance $R_a$ as determined by the tap setting of the potentiometer $22a$;

$R_b$ is the maximum resistance of the potentiometer $22b$; and $K_b$ is the effective percentage of the resistance $R_b$ as determined by the tap setting of the potentiometer $22b$.

For a fixed setting of the potentiometer $22a$, $K_a$ is fixed in equation (1) and $V_c$ varies nonlinearly in the desired fashion indicated for curves C1 and C2 of FIG. 5A, with a scale factor determined by the setting of the tap of the potentiometer $22c$. When $K_b$ is small, an incremental change has a greater effect than when $K_b$ is large, in accordance with curves C1 and C2.

Beyond the group of resistive elements $22a$ through $22d$ in the unit 20-1 is a similar set of resistive elements $23a$ through $23d$ for evaluating the insurance fund needed for the blackout period. The mode of operation of the elements $23a$ through $23d$ is similar to that described for the elements $22a$ through $22d$.

To evaluate the fund needed for providing a widow with a fixed monthly income commencing at age 62 and continuing to age 80, the life expectancy of a female at age 62 being 18 years, the unit 20-1 includes resistive elements $24a$ and $24b$. Since the number of years is known, as well as the discounted amount of insurance that is required per unit of monthly payment, only a regular potentiometer voltage divider $24a$ and a current-converting resistor $24b$ are required.

The final resistive element shown in the unit 20-1 is the potentiometer $21b$ which can be used for adjusting the full scale deflection, i.e., sensitivity, of the meter 60 (FIG. 4B).

In a tested embodiment of the invention, the components of the unit 20-1 in FIG. 4A had the values indicated in table I.

TABLE I

| Component | Value |
| --- | --- |
| Resistors $22a$, $22b$, $23a$, & $23b$ | 1,000 ohms |
| $24a$ | 10,000 |
| $22c$ & $23c$ | 15,000 |
| $23d$ | 110,000 |
| $22d$ | 150,000 |
| $24b$ | 300,000 |

Security Fund Calculator Unit

Considering the security fund calculator unit 20-2 (FIG. 4A), there are individual sets of resistive elements for the "last expenses," "mortgage funds," "education funds," and "readjustment funds" calculations. Each of these calculations entails obtaining a reading which is proportional to a setting of one of the control knobs F6 through F9.

Thus, the first set of resistive elements, for evaluating last expenses, includes a potentiometer $26a$ and a fixed resistor $26b$ of large resistance magnitude. The potentiometer $26a$ forms a first "rung" of the ladder network in the unit 20-2 and serves as a voltage divider according to the setting of its tap by the knob F6. The tap voltage is then converted to a current by the fixed resistor $26b$. Similar sets of elements $27a$ and $b$, $28a$ and $b$, and $29a$ and $b$ are used for the other calculation made by the unit 20-2.

The output currents of the elements 26b, 27b, 28b, and 29b, are combined on a bus 25a and applied to the bus 31 through a potentiometer 25b which is used to make a sensitivity adjustment for the meter 60.

In a tested embodiment of the invention representative values for the various components of the security fund unit 20–2 were shown in table II.

TABLE II

| Component | Value |
| --- | --- |
| Resistors 26a, 27a, 28a & 29a | 10,000 ohms |
| 25b | 50,000 |
| 27b & 28b | 620,000 |
| 29b | 3,000,000 |
| 26b | 5,600,000 |

Net Worth Calculator Unit

The net worth calculator unit 40 is similar in construction to the security fund unit 20–2 and accordingly is a ladder network with parallel potentiometers. Individual resistors of relatively high resistance magnitude are connected to the potentiometer tap points to produce a current-source effect and limit interaction between branches. The potentiometers are voltage dividers 41a and 41b for respectively indicating "present life insurance" assets and "other assets." Their taps are connected to fixed resistors 41a and 41b.

By contrast with the assemblage 20, the net worth unit 40 is connected to a negative polarity bus 44 and its combined outputs, after passing through a meter sensitivity adjustment potentiometer 43, are applied to a bus 45 which extends to either the negative or positive polarity side of the meter 60 (FIG. 4B) according to the setting of the switch unit 50.

It will be appreciated that while the net worth unit 40 has been shown with only two branches in its ladder network, other branches may be provided as well. Thus, the "other assets" branch of potentiometer 42a may be replaced by individual branches for the various items that make up the other assets.

In a tested embodiment of the invention representative values for the components of the net worth unit 40 were as shown in table III.

TABLE III

| Component | Value |
| --- | --- |
| Resistors 41a & 42a | 10,000 ohms |
| 41b & 42b | 130,000 |
| 44 | 50,000 |

Switch and Indicating Units

In the switch unit 50 (FIG. 4B) there is a gang switch with five sections 51 through 55, each having five contact points numbered 0 through 4. These contact points correspond with the similarly numbered positions of the switch S1 in FIG. 2. Hence the zero order position is "off;" the first contact point 1 is for the "total" needs indication; etc.

When the switch S1 is in its first operative position (not shown), the bus 31 is connected to the positive terminal of the ammeter 60 through contact point number 1 of section 52 and returned to ground through contact point number 1 of section 53. Consequently, meter 60 then reads the total current on the bus 31 from the units 20–1 and 20–2 (FIG. 4A), which is a measure of the total needs.

Correspondingly, when the switch S1 is in its second operative position (not shown), the bus 45 is connected to the negative terminal of the ammeter 60 through contact point number 2 of section 53 and returned to ground through contact point number 2 of section 52. Since bus 45 is connected to the net worth unit 40, which is energized from a negative terminal of the source 70, the meter 60 gives an up-scale measure of net worth.

When the switch S1 is in its third operative position (as shown), the bus 31 is directly connected to the positive terminal of the meter 60 through the contact point number 3 of section 52. Further, the bus 45 is connected to the positive terminal of the meter 60 through contact point number 3 of section 52 by way of the contact point number 3 of section 54. The return to ground is at contact point number 3 of section 53. Consequently, the deflection of the needle of the meter 60 is up-scale in accordance with the difference in the currents on buses 31 and 45. This gives the "actual needs" reading.

The various operative positions of the switch S1 are indicated by associated lamps L1 through L4 connected to section 51. Accordingly, when the switch S1 is in its first operative position, the lamp L1 is connected to the source 56 which is desirably the same as the source 71 in the power supply 70 (FIG. 4A).

The lamps L5 and L6 which indicate the respective low and high ranges of the meter 60 are also connected to the source 56. When the switch S2 is in the low-range position (as shown) there is a direct connection to the meter 60 from section 52. In the high range position, however, a variable shunt formed by potentiometer 55–2 or 55–4 is connected across the meter 60 at section 55, depending upon the setting of the switch S1. The shunts 55–2 and 55–4 are variable to provide a sensitivity adjustment when there is a change in meter range.

In a tested embodiment of the invention, the lamps L2 through L6 were standard neon bulbs and the unit 60 was a 50 microampere meter.

Power Supply

Turning to the power supply 70 (FIG. 4A), a constant voltage, positive polarity output is provided at the bus 30 by a voltage regulator diode 75c. This diode is current limited by a protective resistor 75a that is connected to the positive polarity terminal of a full-wave rectifier, as filtered by a capacitor 75b.

The full-wave rectifier is formed by a bridge of rectifying diodes 73a through 73d and energized from a transformer secondary 72b with a grounded center tap 72c. The primary 72a of the transformer is connected to a standard power source 71 by, for example, the cord 16 (FIG. 1).

Corresponding to the elements which produce a constant voltage of positive polarity are similar elements for a constant voltage of negative polarity. These are a voltage regulator diode 74c, a current limiting resistor 74a and a filter capacitor 74b, connected to the negative polarity terminal of the full-wave rectifier.

The transformer secondary 72b desirably provides a step-down in voltage of, for example, approximately 5:1 in order to lower the operating voltage and hence reduce heating effects which could introduce undesirable inaccuracies in the computer.

In a tested embodiment of the invention the components of the power supply were as shown in table IV.

TABLE IV

| Component | | Value or type |
| --- | --- | --- |
| Resistor | 75a | 100 ohms |
| | 74a | 430 |
| Capacitors | 75a & 75b | 50 microfarads |
| Diode | 74c | 10 volts Zener |
| | 75c | 18 |

Investment Calculator Unit

Figure 5B:
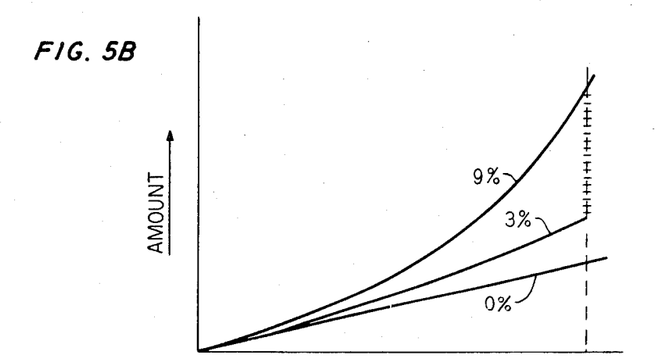

The remaining calculator unit detailed in FIG. 4A is the compound interest calculator 80. This unit includes a branch potentiometer 81 for producing an output voltage that is proportional to monthly investment and a shunt potentiometer 82 for multiplying by the number of years of investment. If the remaining circuitry of the unit 80 is ignored, the voltage developed between the tap of the potentiometer 82 and the bus 44 would be proportional to the product of the periodic investment amount times the number of years of investment. However, the amount invested is subject to the payment of compound interest at a specified rate. Accordingly, the potentiometer 82 is scaled and loaded in a way that produces the desired output characteristics as shown in FIG. 5B. Thus the return for no interest is the linear 0% curve of FIG. 5B. If the interest rate is 3 percent an approximate curve is as indicated in which the incremental additions to the linear characteristics become larger as the investment period increases. Where the interest rate is substantially increased, the incremental additions have an even larger effect as indicated. The applicable mathematical relationship is stated in equation (2).

$$T = \sum^{n} A(1+R)^n \quad (2)$$

Where $T$ is the total value of the investment after $n$ years;

$A$ is the amount invested each year; and $R$ is the rate of interest which is compounded annually.

Considering, for illustration, only the first two terms of equation (2), they are as shown in equation (3).

$$T_{1,2} = nA + (n+1)(n/2)AR \quad (3)$$

Where the symbols are as for equation (2).

Thus the total return can be expressed as the 0% curve of FIG. 5B plus an interest increment which increases as the square of $n$.

The desired effect is produced in the compound interest calculator of FIG. 4A by a network of resistors 83, 84, and 85 which selectively load the potentiometer 82. Illustratively there are nine sets of resistors for each of nine different values of compound interest starting with a zero rate, for which the first group of loading resistors 83–1, 84–1 and 85–1 apply. In order to set the desired interest rate by the knob 13, it is mechanically coupled to two sliders 86 and 87, illustratively set for a 9 percent interest rate. The voltage developed across the resistor 85–8 is a measure of the total amount. To indicate that voltage, the output line 89 connected to the meter 60 of FIG. 4B includes a series resistor 88a. A shunt resistor 88b serves to adjust the scale of the meter.

Figure 5C:
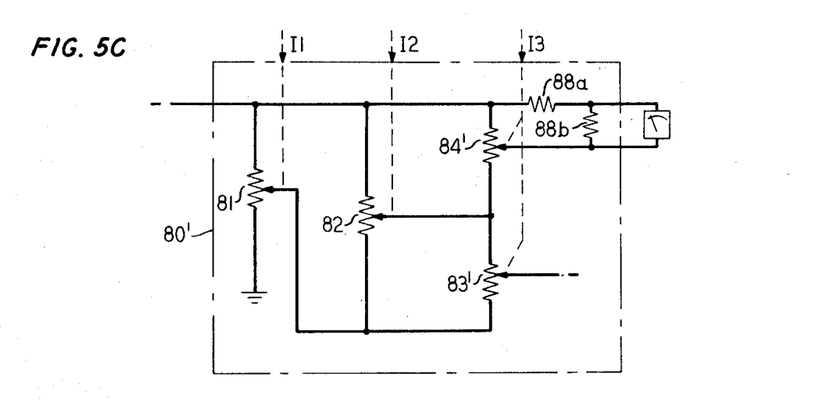
FIG. 5C is a wiring diagram of an alternative compound interest calculator for the wiring and schematic diagram of FIG. 3.

An alternative investment calculator 80' is pictured in FIG. 5C with the compound interest network 83, 84, and 85 replaced by ganged potentiometers 83' and 84'.

In a tested embodiment of the invention, the components of the compound interest calculator 80 were in accordance with table V.

TABLE V

| Component | Value |
|---|---|
| Resistor 81 | 1,000 ohms |
| 88b | 9,530 |
| 82 | 10,000 |
| 88a | 13,000 |

The respective values for resistors 83–1 through 83–10 corresponding to rates of return ranging from zero, and 3 through 10 percent interest, were 2.55, 4.99, 6.65, 8.06, 9.76, 9.31, 18.2, 34, and 60.4 kΩ. The corresponding values for resistors 84–1 through 84–10 were 86.26, 76.4, 64.9, 59, 51.1, 46.4, 35.7, 27.4, 21.5 kΩ; while the corresponding values for resistors 85–1 through 85–9 were 11, 29.4, 36.5, 42.2, 49.9, 54.9, 64.9, 73.2, and 78.7 kΩ.

It is to be noted that in general the sum of each pair of series resistors 84–1 and 85–1 through 84–9 and 85–9 is approximately 100 kΩ.

While various aspects of the invention have been set forth by the drawings and the specification, it is to be understood that the foregoing detailed description is for illustration only and that various changes in circuitry, as well as the substitution of equivalent constituents for those shown and described, may be made without departing from the spirit and scope of the invention as set forth in the appended claims.

What is claimed is:

1. An analog computer for evaluating insurance needs which comprises a first ladder network for producing a current indicative of the sum total of required funds, said first network having input and output terminals and a terminal connected to a common point;

a second ladder network for producing a current indicative of the sum total of available funds, said second network having input and output terminals and a terminal connected to said common point;

a voltage source having a terminal connected to said common point and two output terminals for providing substantially constant voltages of opposite polarity thereon, one of said outputs being connected to the input terminal of said first ladder network and the other of said outputs being connected to the input terminal of said second ladder network;

an indicating ammeter having two input terminals;

means for selectively connecting one input terminal of said ammeter to said common point and the other input terminal thereof to (1) the output terminal of said first ladder network, (2) the output terminal of said second ladder network, or (3) the output terminals of the first and second ladder networks jointly;

thereby to provide an indication by said ammeter of (1) the sum total of required funds when said first ladder network is connected to said ammeter, (2) the sum total of available funds when said second ladder network is connected to said ammeter, and (3) the insurance needs as the difference between total required funds and total available funds when said first and second ladder networks are jointly connected to said ammeter.

2. An insurance analog computer as defined in claim 1 wherein said first ladder network for determining the sum total of required funds includes means for determining the total of funds needed over prescribed periods of time and means for determining the total of lump sum funds.

3. An insurance analog computer as defined in claim 2 wherein said first ladder network includes means for discounting the determination of the funds needed over prescribed periods of time according to the interest payable thereon.

4. An insurance analog computer as defined in claim 2 wherein said means for determining the total of funds needed over prescribed periods of time comprises a plurality of variable resistors, one for each different period of time and settable in accordance therewith, each interconnecting said common point with the input terminal of said first ladder network, a plurality of potentiometers, each directly in shunt with a different one of said variable resistors and having a tap point that is settable in accordance with an amount per unit of time, and a plurality of resistors, each interconnecting a tap point of one of said potentiometers with the output terminal of said first ladder network for converting the voltage at said tap point to a counterpart magnitude of current.

5. An insurance analog computer as defined in claim 4 wherein said first ladder network includes means for discounting the determination of the funds needed over prescribed periods of time according to the interest payable thereon, comprising a second plurality of variable resistors, each interconnecting one of the first mentioned variable resistors with the input terminal of said first ladder network and settable according to the interest payable.

6. A life insurance analog computer as defined in claim 1 wherein
said first ladder network includes an income fund calculator unit and a security fund calculator unit;
said income fund calculator unit comprises (a) a plurality of pairs of series-connected variable resistors interconnecting the input of said first ladder network with said common point, one of said variable resistors in each pair being settable in accordance with the time period that income is to be provided and the other variable resistor being settable in accordance with the interest payable on said income fund, (b) a plurality of potentiometers, each being connected in shunt with a time period variable resistor and having a tap point that is settable in accordance with a periodic income amount, (c) a variable resistor for adjusting the deflection sensitivity of said indicating ammeter connected to the output terminal of said first ladder network, and (d) a plurality of resistors for converting voltage to current interconnecting the tap points of said potentiometers with said resistor for adjusting deflection sensitivity;
said security fund calculator unit comprises a second plurality of potentiometers interconnecting the input terminal of said first ladder network with said common point and each having a tap point that is settable in accordance with the value of a specified obligation, (b) a second variable resistor for adjusting the deflection sensitivity of said indicating ammeter connected to the output terminal of said ladder network and (c) a plurality of resistors for converting voltage to current interconnecting the tap points of the second mentioned potentiometers with said second resistor for adjusting deflection sensitivity;
said second ladder network comprises (a) a third plurality of potentiometers interconnecting the input terminal of said second ladder network with said common point and each having a tap point that is adjustable in accordance with the value of a specified asset, (b) a third variable resistor for adjusting the deflection sensitivity of said indicating ammeter connected to the output terminal of said ladder network, and (c) a plurality of resistors for converting voltage to current interconnecting the tap points of the third mentioned potentiometers with said third resistor for adjusting deflection sensitivity.

7. A life insurance analog computer as defined in claim 6 wherein
said voltage source comprises a first voltage regulator diode interconnecting the input terminal of said first ladder network with said common point, a second voltage regulator diode interconnecting the input terminal of said second ladder network with said common point, a full-wave rectifier having input terminals jointly connected to said common point and output terminals, a first protective resistor interconnecting one output terminal of said full-wave rectifier with said first voltage regulator diode, and a second protective resistor interconnecting the other output terminal of said full-wave rectifier with said second voltage diode.

8. An analog computer as defined in claim 1 further including an investment calculator unit energizable by said voltage source and connectable to said indicating ammeter by the connecting means comprising
means for producing a voltage that is proportional to the product of a periodic investment by the time period of the investment and
means for converting the produced voltage to a current indicative of the value of the investment at a prescribed rate of compound interest.

9. An analog computer as defined in claim 8 wherein
the producing means comprises a first potentiometer interconnecting an output terminal of said voltage source with said common point and having a tap point that is adjustable to provide a voltage proportional to the magnitude of each periodic investment, a second potentiometer interconnecting said tap point with the output terminal of said voltage source and having a tap point that is adjustable according to the interval of the periodic investments;
and the converting means comprises a plural set of resistors, each set including a first resistor connected to the tap point of said first potentiometer, a second resistor connected to the output terminal of said voltage source, and a third resistor connected to said second resistor, and means controlled according to the prescribed rate of interest for connecting said first resistor to said second resistor and for applying the voltage developed by said second resistor to said indicating ammeter.

10. An analog computer as defined in claim 8 wherein
the converting means comprises two potentiometers in series connected in shunt with the producing means, said potentiometers having tap points that are ganged together and settable according to a prescribed rate of compound interest, and means for applying the voltage developed at the tap point of one of said potentiometers to said indicating ammeter.

* * * * *

UNITED STATES PATENT OFFICE
CERTIFICATE OF CORRECTION

Patent No. 3,634,669     Dated Jan. 11, 1972

Inventor(s): Charles A. Soumas and David J. Spontak

It is certified that error appears in the above-identified patent and that said Letters Patent are hereby corrected as shown below:

Cover sheet, item [45], "Patented Jan. 11, 1971" should read --Patented Jan. 11, 1972--; and Cover sheet, Item [73] should read -- Assignee Beckman Instruments, Inc.,    Cedar Grove, N. J. --.

Signed and sealed this 28th day of November 1972.

(SEAL)
Attest:

EDWARD M. FLETCHER, JR.
Attesting Officer

ROBERT GOTTSCHALK
Commissioner of Patents